United States Patent [19]

Lautenschläger et al.

[11] Patent Number: 5,292,190
[45] Date of Patent: Mar. 8, 1994

[54] HOLLOW STOCK FILLED WITH FOAM FOR MAKING DRAWER SIDES AND A METHOD OF MANUFACTURING SAME

[75] Inventors: Horst Lautenschläger, Reinheim; Horst Berger, Bielefeld, both of Fed. Rep. of Germany

[73] Assignee: Karl Lautenschläger GmbH & Co. KG Möbelbeschlagfabrik, Reinheim, Fed. Rep. of Germany

[21] Appl. No.: 625,910

[22] Filed: Dec. 11, 1990

[30] Foreign Application Priority Data

Feb. 13, 1990 [DE] Fed. Rep. of Germany ....... 4004332

[51] Int. Cl.⁵ .................... A47B 88/00; B32B 1/06
[52] U.S. Cl. ................... 312/330.1; 428/35.8; 428/36.5; 428/71; 428/319.1; 312/334.7
[58] Field of Search ............ 428/71, 35.8, 317.5, 428/319.1, 36.5; 312/273, 370.1, 334.7

[56] References Cited

U.S. PATENT DOCUMENTS

| 3,498,001 | 3/1970 | MacDonald | 428/71 |
| 3,610,720 | 10/1971 | Hosmer | 312/330 |
| 3,697,633 | 10/1972 | Edgar | 428/317.5 |
| 3,933,401 | 1/1976 | Lampe et al. | 428/43 |
| 4,341,831 | 7/1982 | Kleiss | 428/319.1 |
| 4,725,471 | 2/1988 | Imhoff | 428/319.1 |
| 4,776,903 | 10/1988 | Nordskog | 428/314.4 |
| 4,872,735 | 10/1989 | Rolk et al. | 312/342 |
| 4,978,562 | 12/1990 | Wycech | 428/36.5 |
| 5,180,217 | 1/1993 | Lautenschlager | 312/334.7 |

Primary Examiner—George F. Lesmes
Assistant Examiner—Christopher Brown

[57] ABSTRACT

The invention relates to a preferably hollow metal stock for drawer sides, especially drawer sides, and to a method for the production of such hollow stock. The hollow material has a hollow space which is foam-filled, to improve the properties of the action of a drawer made from the stock by reducing the noise that occurs when a drawer is opened and closed. The strength of the stock is also improved and as is a drawer made from the stock.

2 Claims, 1 Drawing Sheet

HOLLOW STOCK FILLED WITH FOAM FOR MAKING DRAWER SIDES AND A METHOD OF MANUFACTURING SAME

BACKGROUND OF THE INVENTION

The invention relates to hollow stock filled with foam for making drawer sides, and to a method of manufacturing it. In particular the invention concerns extruded hollow drawer side stock or such stock formed from sheet metal.

Drawers for use in the manufacture of furniture are increasingly being manufactured with sides made from hollow plastic or metal stock; drawers whose sides are made from hollow metal stock are being used especially for large-size drawers which are subjected to loads of great weight. Hollow stock made from light metal alloys is used in making such drawer sides. Such material is very strong, has a relatively low specific weight, and can be made by extrusion in a great variety of shapes. Hollow metal stock extruded from aluminum alloys, however, is comparatively expensive due to the high invested cost of the extruders and extrusion dies that are needed.

According to an earlier patent application of the applicant, the possibility also exists of assembling the drawer-side hollow stock from at least two pieces bent from sheet metal which are laid one over the other lengthwise and joined together. In this manner more complex drawer-side stock can be assembled from relatively simple pieces which can be made by bending from strips of sheet metal. The applicant's earlier proposal was based on welding together superimposed portions of an upper part which includes, as the upper drawer side margin, an upper strip-like leg section serving as the upper drawer side margin, and, bent down therefrom, the upper portion of at least one web, and a lower part which includes one lower strip-like leg section holding the drawer bottom and at least one leg bent therefrom as the bottom web portion.

It has been found in practice, however, that drawers equipped with hollow metal sides of this kind are comparatively noisy in operation, since metal is easily made to vibrate, and the hollow spaces within the sides act as resonant cavities. This is true both of extruded hollow metal drawer sides and of those composed of separate sheet metal parts. Particularly in the case of drawer sides which are used in drawers without solid bottoms—in the case of cardfile drawers for example—it is found that sides consisting of resilient metal material are relatively liable to twisting. This is also true of drawer sides made from resilient hollow plastic stock.

The invention is therefore addressed to the problem of making available a hollow drawer side stock and a corresponding manufacturing process by which considerably improved running characteristics can be achieved in a cabinet drawer. In particular, easy, quiet action is made possible.

SUMMARY OF THE INVENTION

To solve this problem the invention provides, in a hollow drawerside material, for the hollow space to be filled with a foam. Preferably a polyurethane plastic is used.

By filling the hollow with foam the sound is definitely damped when the metal walls are set in vibration. The ability of the metal drawer sides to vibrate is in turn damped by the foam material in contact with it. The action of a drawer equipped in this manner is therefore quieter. At the same time the drawer side made from the foam-filled stock is considerably more resistant to bending and winding than an unfoamed side. The improvement of the resistance to deformation is found in both metal and plastic drawer sides.

The properties of the foam-filled hollow drawer side material depend to a great extent on the physical properties of the foam. A hard foam will contribute to a special degree to strength, while a soft, elastic foam will have mainly a noise-damping action.

With a partial sacrifice of the maximum achievable strength it is furthermore possible to reduce the thickness of the walls of the hollow stock. If relatively expensive light metals are used in making the hollow stock, a cost saving can be achieved in spite of the additional step of filling the stock with foam. If very light foams are used and at the same time the wall thickness of the stock is reduced, the weight of the drawer side can also be reduced. This results on the one hand in a more pleasant handling of the drawer when it is removed, and in easier action when it is in place. For the manufacture of a foam-filled drawer side material the invention provides for alternative methods in the case of extruded materials and in the case of materials made from one or more sheet metal parts.

An especially stable drawer side stock is obtained by making the stock by extrusion and then installing a foam in the hollow space. The extrusion method permits a great variety of cross-sectional shapes and results in a seamless material of relatively great strength. This material is additionally stabilized by filling the hollow space with foam. Therefore, it is especially recommended for drawer sides which are not going to be stabilized by a bottom, for example, and therefore must be especially stiff. Drawers of this kind can be used for hanging card files and the like. Extruded hollow stock, however, can also be made with especially thin walls, since no seams are present that might constitute weak points. The hollow stock manufactured by extrusion and filled with foam can therefore be used advantageously also for drawers which must be especially light.

For the production of a drawer side from bent sheet-metal parts provision is made in an alternative procedure for the hollow stock to be bent or rolled from at least one strip of sheet metal, and for the foam to be put into at least one of the bent parts. If the hollow stock is bent or rolled in one piece from sheet metal, provision is made for applying foam or foam-forming substances on the inside of the at least partially still open piece, in a step preceding the final bending or rolling action, and for closing the piece that contains the foam in a final bending step, so that finally the foam completely fills the hollow space. The closing can be performed by welding, gluing, or riveting, or by snapping together mating portions.

If the drawer side is assembled from two hollow pieces bent from sheet metal, first these pieces are made, then foam is placed within one of the parts forming the hollow space, the parts are placed in contact with one another in certain areas, and there they are bonded together such that the foam will just fill the hollow space which they form.

The plastic can be placed in the hollow space in various ways, depending on whether the stock is extruded or is composed of sheet metal parts, and on what working properties the foam has. On the one hand it is possible to inject or force a pre-blown foam into an extruded hollow piece or to apply it to the interior of a bent metal piece or to the inside of a still open full bent sheet metal piece. In the case of a reactively self-foaming plastic, the latter can under certain circumstances be inserted in strand form or be poured into the hollow space. For a drawer side that is bent from a single piece of sheet metal it may be desirable to apply a self-foaming plastic to the inside of the open piece and close it before the foaming action ends.

The hollow space is, as a rule, filled with foam over its entire cross section to completely fill the hollow that otherwise could form a resonant cavity and at the same time by contact with the latter reducing the ability of the wall to vibrate while increasing the strength of the piece.

BRIEF DESCRIPTION OF THE DRAWINGS

The invention will be explained below with the aid of the embodiments represented in the drawings, wherein.

DESCRIPTION OF PREFERRED EMBODIMENTS

Figure 1:
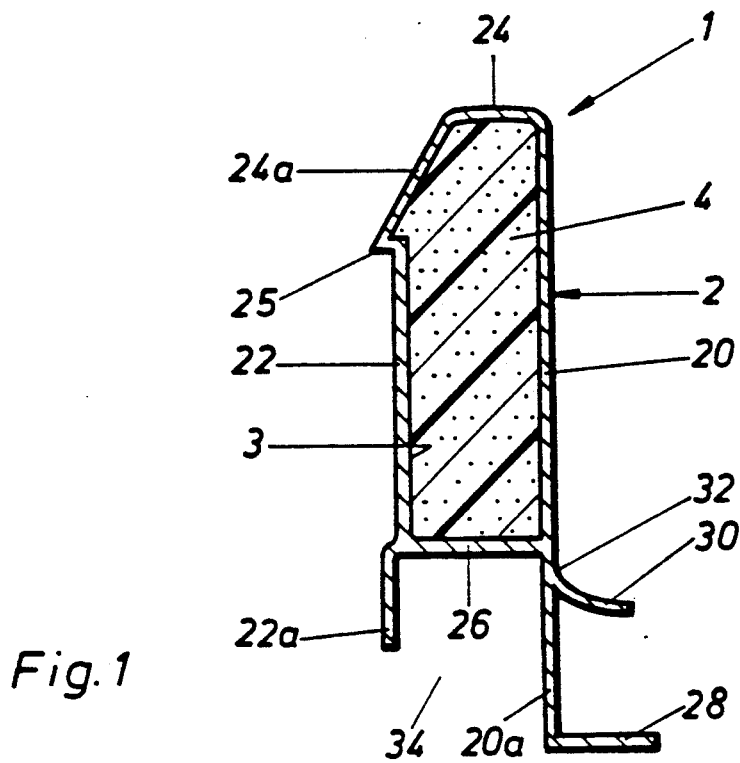
FIG. 1 is a cross-sectional view of a hollow drawer-side stock made from metal by the extrusion method and filled with foam in the manner of the invention.

FIG. 1 shows a hollow material for a drawer side, generally indicated at 1, which consists of an extruded piece 2 whose hollow space 3 is completely filled with a foam 4. The hollow piece 2 consists, in its basic form, of two vertical walls 20 and 22 which are joined together by cross-members 24 and 26. From the bottom end 20a of the wall 20 extending below the bottom cross member 26 a flange 28 projects outwardly at right angles, and when the stock is used for making a drawer side it supports a drawer bottom that is not shown in the drawing. Another flange 30 is formed on the outside of the wall 20, parallel to the limb 28, and the distance between the first flange 28 and the second flange 30 is best made equal to the thickness of the anticipated drawer bottom which is not represented. Between the second flange 30 and the upper portion of the wall 20 there is formed a flute 32 creating a rounded transition from the inside face 20 of the drawer side and the drawer bottom. The second wall 22 vertically defining the hollow space 3 likewise extends downwardly beyond the bottom transverse limb 26 with a flange 22a, so that an inverted channel 34 is formed by flanges 22a and 20a and by the transverse limb 26, and can serve to accommodate a drawer slide. A downwardly slanting marginal portion 24a is formed on the top 24 of the piece. The marginal portion 24a is joined to the wall 22 by a short transverse portion, thus forming an outwardly projecting ledge 25 at that point.

The foam 4 filling the hollow space 3 of the hollow stock 2 can be a hard foam or a resilient soft foam, depending on the properties required in the foam-filled piece. It can be installed in the hollow 3 in various ways. If a ready-made soft foam material is used, for example, a strip of substantially rectangular cross section having a cross-sectional area slightly greater than the cross-sectional area of the hollow 3 can be forced into the hollow space 3 from one end. In the case of an already prepared but not yet cured foam it is possible to inject it into the hollow space 3 to fill out the latter and then allow the foam to cure. If a reactively self-foaming prepolymer is used, however, an appropriate amount can be introduced into the hollow space in the form, for example, of a bead of prepolymer, and then the plastic will foam up of itself and fill the entire hollow space 3.

Figures 2, 3:
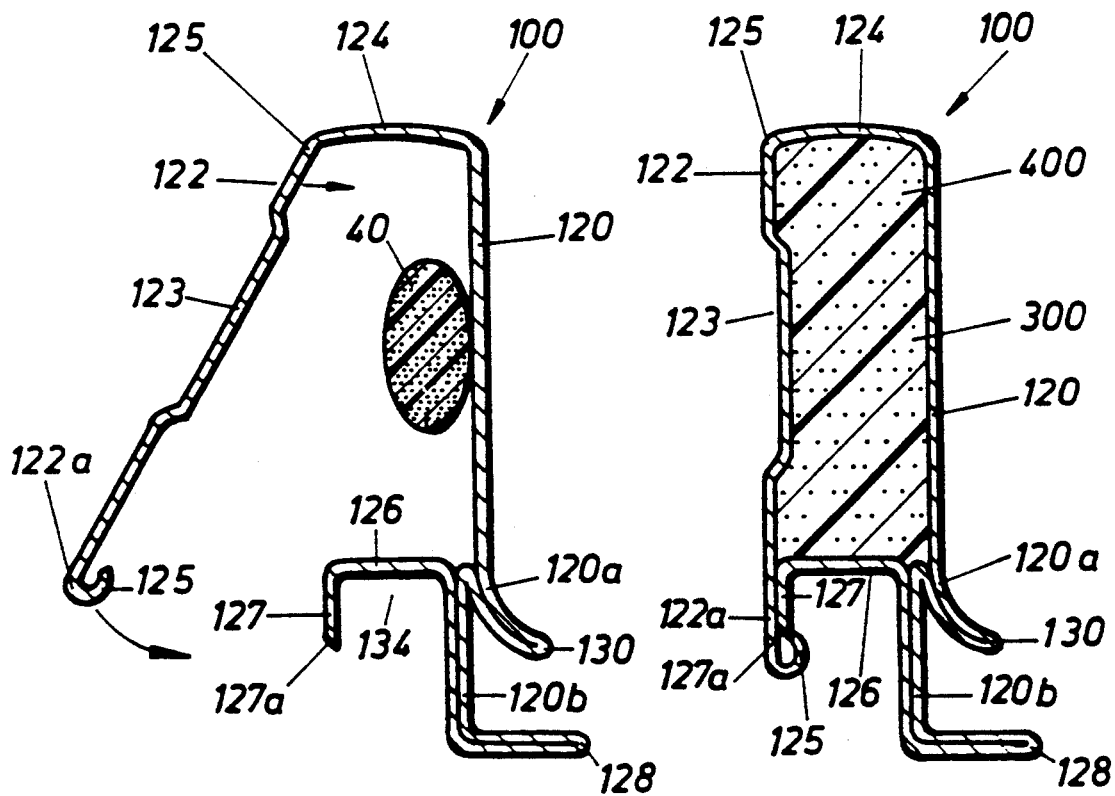
FIG. 2 is a corresponding cross-sectional view of a hollow material for making a drawer side, which is formed from sheet metal and is still partially open, with an inserted bead of foam-forming substance.
FIG. 3 is a corresponding cross-sectional view of the closed, foam-filled hollow stock for a drawer side according to FIG. 2.

In FIGS. 2 and 3 there is shown another embodiment of the invention in two different stages of formation.

FIG. 2 shows the cross section of a hollow stock formed in one piece from a strip of sheet metal but not yet closed. The sheet metal piece 100 is comprised of a transverse portion 124 from which two walls 120 and 122 are bent along parallel lines. A shallow depression 123 is formed in the outer wall 122 which is free at its bottom end 122a. At its bottom end 120a the inner wall 120 is bent outwardly from the hollow in formation, in an approximately quarter-circular shape, and doubled back in the opposite direction so as to form the flute 130. In prolongation of the inner wall 120 there is formed an additional wall portion 120b, from which a limb 128 is bent at right angles back toward the flute 130. At an area of the wall 120b, which is to be prolonged for this purpose, a limb portion 126 is doubled back, and thereon an additional limb portion 127 is formed at right angles. The limbs 120b, 126 and 127 form an inverted channel 134 which corresponds to the channel 34 represented in FIG. 1.

In a final bending action at the corner 125 between portion 124 and the wall 122, the integral sheet-metal piece 100 can be closed up. For this purpose the wall portion 122a is pressed toward limb portion 127. To permit the piece to be snapped shut, the limb portion 127 is chamfered at its free end 127a and when brought together with the wall 122 its chamfered end will be caught behind a catch projection 125 formed at the bottom free end 122a of the wall.

A prepolymer bead 40 is placed in the still-open sheet-metal piece 100, as shown in FIG. 2. For example, a polyurethane prepolymer can be used, which reactively foams up automatically by the liberation of carbon dioxide. As soon as the bead is installed the piece is snapped shut as described.

The piece thus assumes the cross-sectional shape shown in FIG. 3, in which identical parts are identified with the same reference numbers and therefore do not have to be further explained. When the piece is closed as described by the catching of the chamfered edge 127a of limb 127 behind the catch projection 125, a hollow space 300 is formed. The outgassing of the prepolymer bead 40 forms the foam 400, which in time fills hollow space 300 completely if the amount selected is appropriate.

Other self-foaming substances can also, of course, be placed in such hollow pieces which are composed of at least one folded or rolled sheet-metal piece. For example, a full-blown soft foam strip could, again, be inserted into the partially open metal piece (see FIG. 2) and then the piece could be closed. The soft foam is thereby compressed and thus completely fills the hollow space 300. Again, a blown but not yet cured foam corresponding at least to the volume of the hollow space could be placed in the open piece; when the piece is closed the still-uncured foam will adapt to the shape of the hollow space and fill it up.

Chemically different foams can be used, such as polyurethanes, synthetic rubbers, etc., can be used, depending on the properties desired in the foam-filled piece.

We claim:

1. A hollow stock for drawer sides, said hollow stock comprising a single metal sheet bent or rolled to comprise uniformly in the longitudinal direction a cross-sectional hollow space for accommodating therein a foam filling, upper and lower outwardly projecting flanges having a folded-back double wall construction, said upper and lower flanges forming therebetween a slot for accommodating a side edge of a drawer bottom plate, and a catch projection formed at a first free end of said sheet and an outwardly projecting catch limb formed at a second free end of said sheet, said catch projection being snappingly retained on said catch limb to form said hollow space, said catch limb and said lower flange forming therebetween an inverted channel for accommodating a drawer slide.

2. An article for use as hollow stock for drawer sides, said article comprising a single metal sheet bent or rolled to comprise uniformly in the longitudinal direction upper and lower outwardly projecting flanges having a folded-back double wall construction, said upper and lower flanges forming therebetween a slot for accommodating a side edge of a drawer bottom plate, and a catch projection formed at a first free end of said sheet and an outwardly projecting catch limb formed at a second free end of said sheet, said catch projection being adapted for snapping retention on said catch limb to form a cross-sectional hollow space for accommodating therein a foam filling, said catch limb and said lower flange forming therebetween an inverted channel for accommodating a drawer slide.

* * * * *